United States Patent

[11] 3,555,277

| [72] | Inventors | Frank H. Attix<br>Hillcrest Heights;<br>Edward J. West, Silesia, Md. |
|---|---|---|
| [21] | Appl. No. | 740,608 |
| [22] | Filed | June 27, 1968 |
| [45] | Patented | Jan. 12, 1971 |
| [73] | Assignee | to the United States of America as represented by the Secretary of the Navy |

[54] HIGH THERMAL CONDUCTIVITY GAS THERMOLUMINESCENT DOSIMETER
10 Claims, 5 Drawing Figs.

[52] U.S. Cl. ............................................. 250/71, 250/71.5
[51] Int. Cl. ............................................. G01t 1/11
[50] Field of Search ............................................. 250/71, 71.5

[56] References Cited
UNITED STATES PATENTS

| 3,115,578 | 12/1963 | Schulman ..................... | 250/71 |
| 3,141,973 | 7/1964 | Heins et al. ..................... | 250/71 |
| 3,376,416 | 4/1968 | Rutland et al. ............... | 250/71X |
| 3,427,452 | 2/1969 | Hartin .......................... | 250/71 |
| 3,300,643 | 1/1967 | Mc Call ....................... | 250/71 |

*Primary Examiner*—Walter Stolwein
*Assistant Examiner*—Davis L. Willis
*Attorneys*—R. S. Sciascia, M. L. Crane and A. L. Branning

ABSTRACT: This invention is directed to an improved thermoluminescent dosimeter of the type in which the dosimeter material and heater elements are combined into a unitary element. The improvement is brought about by increasing the thermal conductivity between the heating means and the thermoluminescent material.

PATENTED JAN 12 1971

3,555,277

INVENTORS
FRANK H. ATTIX
EDWARD J. WEST

BY Melvin L. Crane AGENT

ATTORNEY

HIGH THERMAL CONDUCTIVITY GAS THERMOLUMINESCENT DOSIMETER

The invention described herein may be manufactured and used by or for the Government of the United States of America for governmental purposes without the payment of any royalties thereon or therefor.

This invention is directed to a thermoluminescent dosimeter and more particularly to an improved thermoluminescent dosimeter.

Mainly, three types of thermoluminescent (TL) dosimeters exist today. These are a those in which the TL phosphor is enclosed as a powder inside a sealed glass envelope and makes use of an outside heater source, b the TL phosphor is enclosed as a powder or solid block inside a sealed glass envelope, which also encloses an ohmic heater, and c the TL phosphor is employed as a loose powder or block which is poured or placed on a heating planchet for measuring the thermoluminescence. In each of the above types, heating of the TL phosphor to release thermoluminescent light signals (which is a measure of the ionizing radiation dose received) is accompanied by the release of "blackbody" or thermal radiation which competes with the TL signal. The operation of thermoluminescent dosimeters is adequately described in an article "Thermoluminescent Dosimeters for Personnel Monitoring," by F. H. Attix, E. J. West, A. E. Nash and S. G. Gorbis published in the Report of NRL Progress Mar. 1968 issue. Similar dosimeters are also set forth in U. S. Pat. No. 3,115,578.

In the prior art TL dosimeters in which the phosphor is within an envelope, the heat is conducted to the phosphor by the gas within the envelope. If the dosimeter is heated slowly to a temperature of about 300° C. 400° C. needed to release the thermoluminescence, the phosphor follows closely the temperature of the heating element throughout the heat cycle. Thus, the heating element does not emit appreciably more radiant heat per unit surface area than that coming from the phosphor itself. Such slow heating and reading of the radiation dose is inconvenient for practical dosimetry and the intensity of the TL light emitted remains low throughout. As such, the output signal may suffer from competition by background noise and variable dark current in the light-detecting photomultiplier tube. To avoid the slow heating process, one may heat the TL phosphor more rapidly (approximately 10 seconds) to improve the reading convenience and the TL signal-to-noise ratio, however, by faster heating the quasistatic thermal equilibrium between the phosphor and heater no longer holds. The temperature of the heating means may run well ahead of the phosphor temperature, thereby giving rise to excessive thermal radiation signals detected by the photomultiplier tube. Thus, the minimum radiation dose detectable with a TL dosimeter with fast heating is usually limited by the presence of the competing heat signal. The heat transfer gases used within the dosimeter envelope in prior art detectors have had poor thermal conductivity, thereby adversely affecting operation of such dosimeters. Therefore, in order to bring about an improved TL dosimeter, the gases used in the envelope for heat transfer between the heater and the phosphor should be of a type that has good thermal conductivity, such gases being hydrogen, helium, or neon. In dosimeters where the phosphor is not adversely affected by a hydrogen atmosphere, hydrogen is used because it has the highest thermal conductivity, being seven times the thermal conductivity of air or nitrogen.

It is therefore an object of the present invention to provide an improved thermoluminescent dosimeter which provides an improved signal-to-noise ration.

Another object is to provide a thermoluminescent dosimeter which produces very little if any heat signal while allowing a rapid heating of the phosphor.

Still another object is to lower the limit of the detectable dose of a thermoluminescent dosimeter.

Other and more specific objects of this invention will become apparent upon a careful consideration of the following detailed description when taken together with the accompanying drawings, in which.

Figure 1:
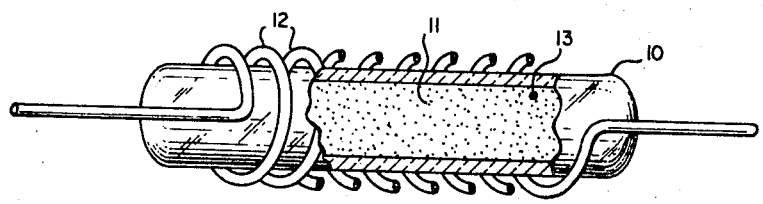
FIG. 1 illustrates a TL dosimeter formed with granules of phosphor material surrounded by a gas filling within an envelope which is heated by an outside source.

Now referring to the drawing, there is shown by illustration different modifications of the invention which brings about an improved TL dosimeter. FIG. 1 is directed to a sealed transparent tube 10 which includes therein TL phosphor granules 11 such as $CaF_2$: Mn or LiF that have energy storage persistence at normal temperature. The space between the phosphor granules is filled with a high-thermal-conductivity gas 13 such as hydrogen, helium or neon at a suitable pressure such as one atmosphere. The tube is surrounded by a heater coil 12 which heats the TL phosphor material uniformly along the length of the tube. Upon reaching the proper temperature needed to release thermoluminescence, the light released is directed onto a photodetector to indicate the amount of light produced and thereby the radiation. Such a detector is well-known in the art, and is not shown for simplification of the drawings.

Figure 2:
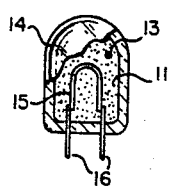
FIG. 2 illustrates a modification of the device in FIG. 1 which includes an internal ohmic heating element within the phosphor material.

FIG. 2 illustrates a TL dosimeter including heat-sealed transparent envelope or tube 14 which includes therein a filling of phosphor granules 11 which surround a U-shaped ohmic heating element 15. The ohmic heating element is electrically secured to a pin 16 at each end thereof for connection with an electrical current. The tube also includes therein a high conductivity gas 13 such as included in the dosimeter shown by FIG. 1. The gas fills the voids between the granules providing a heat path between adjacent granules.

The dosimeters shown by example in FIGS. 1 and 2 include granules of phosphor material therein, therefore the high thermal conductivity gas is dispersed throughout the granules, filling the voids between the granules. Since the gas is a high thermal conductivity type, heating by the outside coil in FIG. 1 or by the ohmic heating element of FIG. 2 transmits heat to the gas which then transmits the heat to the phosphor. Since the gas is of a high thermal conductivity type the phosphor is heated at a fast rate so that the phosphor is heated at substantially the same rate as the heaters. Thus, excessive thermal radiation signals are avoided while permitting a fast determination of dose which more accurately indicates the radiation dose.

Figure 3:
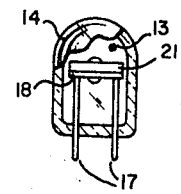
FIG. 3 illustrates a modification in which a single crystal or compressed block of phosphor material is mechanically fastened to a metal heater strip and surrounded by a gas filling.

FIG. 3 illustrates a modification of the device shown in FIG. 2. The dosimeter includes a transparent envelope or tube 14 into which electrical conductors 17 extend. A metallic strip heater 18, secured to the ends of the conductors 17, heats a single crystal or compressed block of phosphor 21 that is mechanically fastened thereto. The tube also includes a high thermal conductivity gas 13 which envelopes the phosphor and especially the narrow space between the phosphor and the heater, thereby aiding in the fast heating process.

Figure 4:
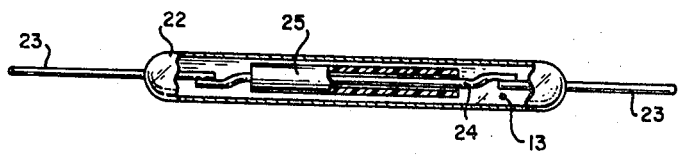
FIG. 4 illustrates a TL dosimeter including a spaghetti-shaped solid phosphor tube mounted loosely onto a center heater wire with a gas filling surrounding the elements within an envelope.

FIG. 4 illustrates an elongated transparent tubular envelope 22 similar to that shown in FIG. 1. An electrically conductive pin 23 extends axially into each end of the tube 22 and is electrically connnected to an ohmic heater 24 that extends along the axis of the envelope. A spaghetti-shaped solid tubular phosphor 25 which may be formed by extrusion is secured loosely over the ohmic heater centrally of the envelope coaxial with the envelope. A high thermal conductivity gas 13 fills the envelope and surrounds the spaghetti-shaped phosphor along the inside surface and outer surface. The gas aids in heating the phosphor at the same rate as that of the ohmic heater.

Figure 5:
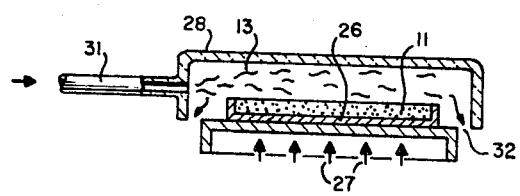
FIG. 5 illustrates a TL dosimeter including a metal planchet which includes therein phosphor granules over which a gas flow is gently directed.

FIG. 5 illustrates a still further modification of the dosimeter. As shown, phosphor granules 11 are evenly dispersed within a metal planchet 26 which is subjected to a heat source 27 for producing thermoluminescence effects in the phosphor. A light-transparent cover 28 is loosely fitted over the planchet and is provided with a tubular member 31 through which a high thermal conductivity gas 13 is gently and slowly admitted and passes over the phosphor granules. The gas flows from the chamber through the space 32 between the cover and the planchet. As the heat source heats the phosphor granules, the high thermal conductivity gas within the voids formed naturally within the phosphor granules aids in evenly heating the phosphor granules. Thus, the phosphor granules are heated at the same rate as the planchet to avoid excessive thermal radiation signals.

It can be seen that in each of the above-described dosimeters the high thermal conductivity gas transfers heat to the phosphor thereby aiding in heating the TL phosphor at the same rate that the heating element is heated. Therefore the above-described dosimeters improve the reading time, improve the thermoluminescent signal-to-noise ratio, and prevent excessive thermal radiation signal by maintaining the phosphor at the same temperature as the heating means. Since the gas used within the envelope fills the voids between the granules or completely surrounds the solid phosphor, the gas transfers heat to the phosphor. Such heat transfer decreases the heating time and the phosphor temperature is increased simultaneously with the increase of the temperature of the heating means.

Obviously many modifications and variations of the present invention are possible in light of the above teachings. It is therefore to be understood that within the scope of the appended claims the invention may be practiced otherwise than as specifically described.

We claim:
1. A thermoluminescent dosimeter which comprises:
 a thermoluminescent phosphor having energy storage persistence at normal temperature;
 a light-transparent container within which said phosphor is held;
 a high thermal conductivity gas;
 said gas surrounding said phosphor in direct contract therewith within said container and filling any void spaces within said phosphor; and
 heater means associated with said container for heating said phosphor and said gas to above the glow temperature of said phosphor.

2. A thermoluminescent dosimeter as claimed in claim 1, in which said high thermal conductivity gas is selected from a group consisting of hydrogen, helium, and neon.

3. A thermoluminescent dosimeter as claimed in claim 2, wherein said gas is hydrogen.

4. A thermoluminescent dosimeter as claimed in claim 2, wherein as said gas is helium.

5. A thermoluminescent dosimeter as claimed in claim 2, wherein said gas is neon.

6. A thermoluminescent dosimeter as claimed in claim 2, wherein, said phosphor is in the form of granules.

7. A thermoluminescent dosimeter as claimed in claim 6, wherein, said heater means is an ohmic element surrounded by said phosphor granules.

8. A thermoluminescent dosimeter as claimed in claim 2, wherein:
 said phosphor is of a solid piece; and
 said heater extends through said phosphor.

9. A thermoluminescent dosimeter as claimed in claim 2, wherein:
 said phosphor is of a solid piece; and
 said heater is secured to one side of said phosphor.

10. The method of operating a thermoluminescent dosimeter consisting of a powdered phosphor or a solid piece of phosphor, from which the thermoluminescent signal is released comprising the step of heating said phosphor on a planchet over which hydrogen, helium, or neon is slowly directed.